Nov. 19, 1968 R. B. CALDWELL 3,411,310
TIME DELAY MECHANISM FOR REFRIGERATION SYSTEM
Filed March 17, 1967
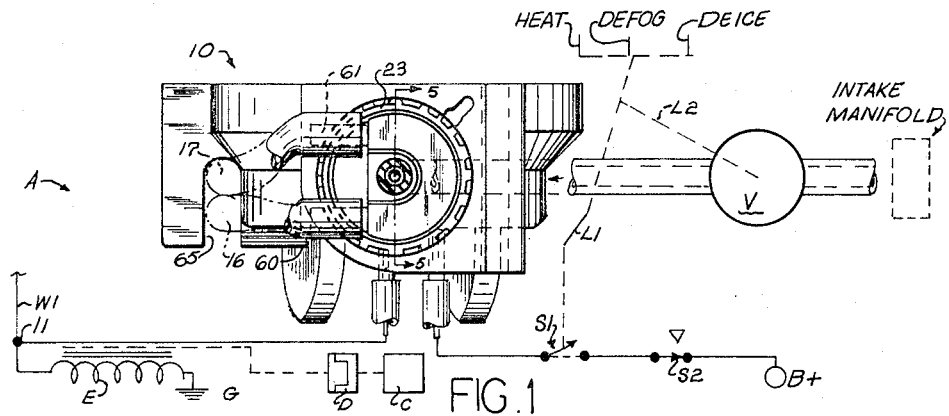
FIG.1
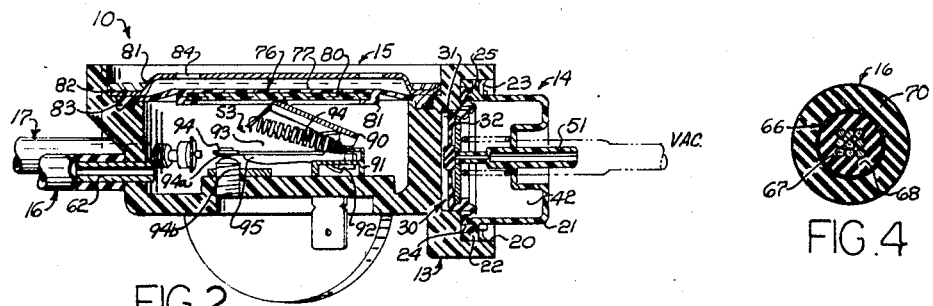
FIG.2
FIG.4
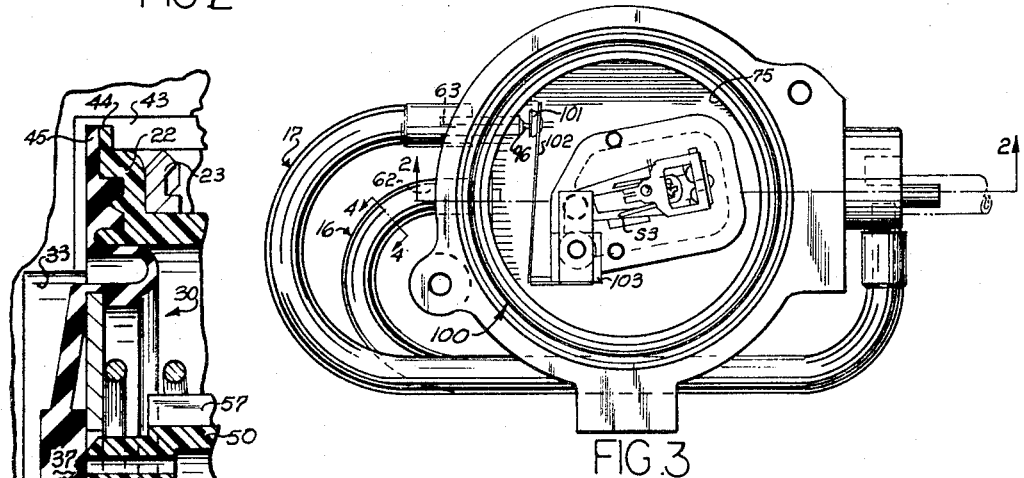
FIG.3
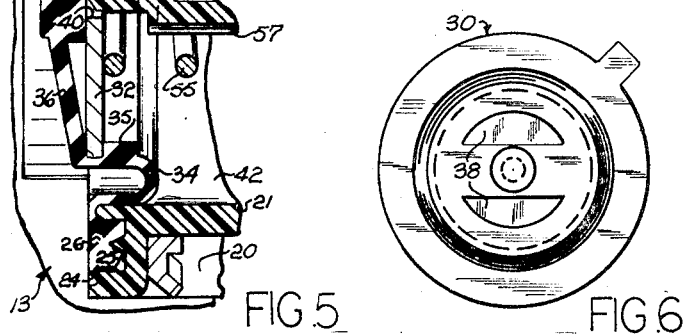
FIG.5
FIG.6
INVENTOR.
ROLAND B. CALDWELL
BY Yount, Raney, Flynn and Juelli
ATTORNEYS

United States Patent Office 3,411,310
Patented Nov. 19, 1968

3,411,310
TIME DELAY MECHANISM FOR
REFRIGERATION SYSTEM
Roland B. Caldwell, Worthington, Ohio, assignor to Ranco Incorporated, Franklin County, Ohio, a corporation of Ohio
Filed Mar. 17, 1967, Ser. No. 624,061
14 Claims. (Cl. 62—158)

ABSTRACT OF THE DISCLOSURE

A time delay mechanism for connection to a source of vacuum pressure includes a pressure regulating valve means operative to produce a relatively constant vacuum pressure regardless of variations of the pressure of the vacuum source, a chamber having a wall portion formed by a resiliently flexible diaphragm with one side thereof exposed to fluid pressure in the chamber and the other side exposed to atmospheric pressure, a conduit connecting the chamber to the regulated pressure at the valve means, a flow restrictor in the conduit for providing a gradual change in pressure in the chamber in response to the establishment of a regulated pressure at the valve means, and a switch in the chamber which is actuated by the diaphragm as the pressure in the chamber is gradually reduced with the switch being actuated a substantial interval subsequent to establishment of the regulated pressure by the valve means. The time delay additionally includes a second conduit communicating between the chamber and the valve means and a temperature responsive valve within the chamber which is open at ambient temperatures below a predetermined temperature to immediately equalize the pressures in the chamber and at the regulator valve to effect immediate actuation of the switch by the diaphragm.

---

The present invention relates to a time delay mechanism and more particularly relates to a time delay mechanism for controlling operation of an automotive vehicle accessory.

An object of the present invention is the provision of a new and improved time delay mechanism connectible to a source of variable vacuum pressure and operable to effect a control function, such as operation of a switch or the like, a predetermined time after establishment of the source of vacuum pressure and which time delay mechanism is simple in construction, reliable and effective to provide relatively long delays between establishment of the vacuum pressure source and performance of the control function.

Another object of the present invention is the provision of a new and improved time delay mechanism as set forth in the next preceding paragraph and further including valve means for rendering the mechanism ineffective to delay operation of the switch at temperatures below a predetermined temperature.

A still further object of the present invention is the provision of a new and improved time delay mechanism for use in an automotive vehicle for performing a control function a predetermined time after the occurrence of an event and which includes a vacuum regulator means connected to a vacuum source at the vehicle engine, means forming a chamber including a flexible diaphragm providing a wall of the chamber, a first fluid conduit communicating regulated vacuum pressure at the regulator means with the chamber for reducing the fluid pressure in the chamber to the regulated vacuum pressure which conduit includes a flow restrictor for providing a gradual change in the fluid pressure in the chamber, a second fluid conduit for unrestricted communication between the regulator valve and the chamber, temperature responsive valve means for preventing communication between the regulator valve means and chamber through the second conduit at temperatures above a predetermined temperature, and a control switch in the chamber having a part engageable with the diaphragm and which part is moved by the diaphragm as the pressure in the chamber is decreased so as to actuate the switch, and wherein the switch is actuated a predetermined time after the occurrence of the event at temperatures above the predetermined temperature to thereby effect a delayed control function for an accessory of the vehicle.

Other objects and advantages of the present invention will become apparent from a consideration of the detailed description thereof which follows and from the accompanying drawings which form a part of the specification and wherein:

FIG. 1 is an accessory system for an automotive vehicle, shown partly in schematic and including an elevational view of a time delay mechanism embodying the present invention;

FIG. 2 is a sectional view of a time delay mechanism embodying the invention taken approximately at the line 2—2 of FIG. 3;

FIG. 3 is a plan view of a time delay mechanism embodying the invention having parts removed;

FIG. 4 is a sectional view taken approximately at the line 4—4 of FIG. 3;

FIG. 5 is a fragmentary sectional view taken approximately at line 5—5 of FIG. 1 and on a scale which is larger than the scale of FIG. 1; and FIG. 6 is an elevational view of a portion of the time delay mechanism of FIG. 1.

Many automotive vehicles currently being manufactured are provided with combination air-conditioning and heating systems for controlling the temperatures in the passenger compartments thereof. It has been found to be advantageous under certain conditions of usage of the systems to operate the air cooling unit of such systems briefly during the initial operation of the system at atmospheric temperatures well below that at which cooling is normally required. The present invention is directed to a control means which initiates operation of the cooling unit of the system for a relatively short period when the atmospheric temperature is above a predetermined temperature, such as 36° F., and when the heater or a defroster of the vehicle is operating.

A portion of an air-conditioning system A for an automotive vehicle, not shown, is illustrated in FIG. 1 and which system includes a time delay control mechanism 10 embodying the invention. The system A includes an air-conditioning unit compressor C which is adapted to be driven from the engine, not shown, of the vehicle by way of a suitable clutch generally indicated at D. The clutch D is operated in response to energization and de-energization of a solenoid coil E, with the clutch drivingly connecting the engine and compressor when the coil E is energized and disconnecting the compressor from the engine when the coil is de-energized.

The coil E is associated with circuitry (not shown) including a suitable switch or switches for connecting the coil E across an electric power supply, such as the battery of the vehicle, and when operation of the air-conditioning unit is desired, such switch or switches may either be manually actuated by an occupant of the vehicle or actuated automatically by a thermostatic control device. The circuitry referred to may be of any construction and accordingly has not been illustrated, suffice it to say that the coil E is energized by a circuit established across the battery terminals B+, G through contacts of a control switch, or switches, by way of the conductor W.

As is noted above, automotive vehicles of the type referred to include a heater which may comprise an air heating heater core through which engine coolant is circulated and which is positioned so that air is directed thereacross to be heated before entering the passenger compartment. Conventionally, the heater core and an air-cooling unit of the air-conditioning system are located within a common duct with air being directed through the duct and across both the cooling unit and heater core before entering the passenger compartment. Air entering the passenger compartment is directed thereinto by suitably constructed ducts and dampers which are operative, for example, to direct air onto the windshield of the vehicle to remove condensation or ice therefrom.

It is desirable to operate the air-conditioning unit of the vehicle for a relatively short period of time under certain outside air temperature conditions subsequent to starting the engine when the heater is operating or when defogging or deicing of the windshield (not shown) is necessary, so that condensation in the passenger compartment is minimized. Under such conditions, an appropriate "heat," "defog" or "deice" selector button, or lever (shown schematically in FIG. 1), is actuated to close the contacts of a control switch S1 by operating of a linkage L1. Closing the contacts of the switch S1 permits completion of an energizing circuit through the solenoid coil E of the clutch D across the terminals of the power supply through the switch S2, which may be the ignition switch of the vehicle or a switch operated from the ignition, the contacts of the switch S1, normally closed contacts of a switch S3 (see FIG. 2) of the time delay mechanism 10, a junction 11, the solenoid coil E and to the ground terminal G of the power supply.

Energization of the coil E through this circuit drivingly connects the compressor C to the vehicle engine by way of the clutch D as described above. After the compressor C has been operated for a relatively short time, the energization circuit for the coil E is interrupted by opening of contacts of the switch S3 of the time delay mechanism to declutch the compressor C in a manner which is described in detail hereinafter. If temperatures ambient the vehicle are below a predetermined temperature such as 36° F., the time delay is ineffective to delay opening of the contacts of switch S3 so that the switch S3 immediately opens the solenoid energizing circuit when the control switch S1 is closed and the vehicle engine is operating.

In addition to the switch S3, the time delay mechanism 10 includes a body member 13, a vacuum regulating valve means 14 connectable to a source of vacuum pressure at the vehicle engine, through a valve V, which is described more fully hereinafter, a variable volume chamber 15 formed in part by the body 13 and in which the switch S3 is supported, and conduit means 16, 17 for communicating the vacuum regulator means 14 with the chamber 15. As illustrated in FIG. 1, the valve V is opened by a linkage L2 when the heat, defog, or deice selector is operated so that the vacuum regulating valve means 14 is placed in communication with the vacuum pressure at the engine intake manifold at the same time the control switch S1 is closed. It should be noted that while the valve V and control switch S1 have been illustrated as mechanically linked together to be manually operated from the heat, defog or deice selector, the valve and control switch can be electrically operated in response to actuation of the selectors.

The vacuum regulator means 14 is supported in a stepped cylindrical recess 20 formed in the body member 13 and includes a housing 21 formed of a suitable plastic material, or the like, having a radially extended flange portion 22 which is snugly slidable into the recess 20 and which is secured in the recess by a suitable locking ring 23 which has a plurality of teeth thereon which are effective to dig into the material of the body member 13 and maintain the flange portion 22 in engagement with an annular shoulder portion 24 in the recess 20. The flange 22 includes an annular groove 25 formed therein facing the shoulder 24, and which groove receives a lip 26 of a diaphragm assembly 30 so that when the housing 21 is secured in the recess 20, the lip 26 of the diaphragm assembly 30 is sealingly engaged between the flange 22 of the housing 21 and the shoulder 24 of recess 20.

The diaphragm assembly 30 includes a flexible rubber-like diaphragm member 31 which is constructed to movably support a rigid disc member 32 at its central portion. The central portion of the diaphragm which supports the disc member 32 projects slightly into a cylindrical portion 33 of the chamber 20, but short of the bottom of the chamber portion 33. As best seen in FIG. 5, the diaphragm member 31 includes an annular flexible corrugation 34 radially inwardly of the lip 26 which flexes to permit movement of the diaphragm assembly axially of the recess 20, a radially inwardly projecting circular flange 35, a flat annular end portion 36 closely adjacent the flange 35, and a generally cylindrical button-like valve closure member 37 formed integrally in the end portion 36.

The flange 35 and end portion 36 are closely spaced and tightly engage the periphery of the disc member 32 to support the disc member relative to the diaphragm 31 and to provide a seal about its periphery. As illustrated in FIG. 6, the end portion 36 of the diaphragm is provided with a pair of semi-circular apertures 38 which permit pressure communication between the chamber portion 33 and the disc member 32. The valve closure 37 is preferably of greater thickness than the adjacent diaphragm material so that the button part is resiliently urged into engagement with the disc member 32 by the slight stretching of the diaphragm material of the end portion 36 when the disc and diaphragm members are assembled. The valve closure 37 overlies a generally circular aperture 40 in the disc member 32 and due to the thickness of the valve closure 37, is urged into sealing engagement across the aperture 40 in the disc member 32.

From the above description, it should be apparent that the diaphragm assembly 30 and the housing member 21 are constructed so as to provide a chamber 42 within the housing member 21 which is hermetically sealed from the chamber portion 33 of the recess 20 when the parts of the regulator 14 are in their position shown in FIG. 5. The chamber formed in the recess portion 33 communicates with atmospheric pressure surrounding the time delay mechanism 10 through a slot 43 extending radially outwardly of the cylindrical wall of the recess 20 and extending downwardly toward the bottom of the recess 20 through the shoulder 24 as shown in FIG. 5. The housing member 21 and diaphragm member 31 are provided with ears or tabs 44, 45, respectively, which extend into the slot 43 and are urged together to insure sealing of the chamber 42 in the housing member 21 from the atmospheric pressure of the air in the slot 43 while permitting communication between atmosphere and the chamber portion 33.

The housing member 21 includes a centrally disposed tubular member 50 which projects through the chamber portion 42 and through the aperture 40 in the disc member 32. The tubular member 50 is associated with a suitably constructed fitting 51 which extends outwardly away from the housing member 21 and which receives a suitable vacuum conduit communicating with the intake manifold of the vehicle engine through the valve V.

A helical spring 55 surrounds the tubular member 50 and is compressively engaged between the disc member 32 and a spring seat formed by a shoulder of the housing member 21 which surrounds the tubular member 50. The spring member 55 is maintained centered relative to the tubular member 50 by a plurality of axially extending ridges 57 which are spaced circumferentially about the tubular member 50. In the preferred embodiment three such ridges 57 are provided, which are spaced approximately 120° apart around the tubular member 50. It is apparent that the ridges 57 prevent the spring 55 from moving off center of the diaphragm assembly 30 and thereby prevent cocking, tilting, of the diaphragm assembly which might otherwise occur.

After one of the heat, defog, or deice selectors has been operated to effect closing of the control switch S1 and opening of the valve V, the vacuum regulating means 14 operates to maintain a relatively constant vacuum pressure in the chamber 42 thereof which is substantially independent of variations of vacuum pressure in the intake manifold.

With the parts of the vacuum regulator 14 in their positions shown in FIG. 5, the open end of the tube member 50 is engaged by the valve closure 37 of the diaphragm assembly so as to prevent vacuum pressure from being applied in the chamber 42 due to the sealing relationship between the tube 50 and the closure 37. When the chamber 42 is sealed from the vacuum source, as described, the force of the spring 55 tends to move the diaphragm assembly 30 toward the bottom of the recess portion 33 to disengage the closure 37 from the tube 50 and permit vacuum pressure to be communicated to the chamber 42 through the tube member 50. When vacuum pressure is present in the chamber 42, the atmospheric pressure in the chamber portion 33 urges the diaphragm assembly away from the bottom of the recess since the atmospheric pressure overcomes the combined forces of the spring 55 and the vacuum pressure in the chamber 42. As the diaphragm assembly tends to move out of the recess 20, the closure 37 again seals the end of the tube 50 preventing further vacuum pressure from being communicated in the chamber 42 and the end of the tube 50 forms a stop for the closure 37 which maintains the closure 37 stationary relative to the end of the tube 50 during continued outward movement of the diaphragm assembly 30. As atmospheric pressure continues to urge the diaphragm assembly 30 away from the bottom of the recess 20, the disc member 32 is moved out of the recess and away from the closure 37 thereby breaking the sealing engagement between the closure 37 and the disc member 32 so as to permit atmospheric pressure to enter the chamber 42 through the aperture 40 in the disc member. When the atmospheric pressure enters the chamber 42 as described, the pressure differential across the diaphragm assembly 30 is reduced so that the pressure in the chamber 42 in combination with the force of the spring 55 overcomes the atmospheric pressure in the chamber portion 33 and tends to move the diaphragm assembly 30 back toward the bottom of the recess 20. It should be apparent that the actions just described have been exaggerated for the purposes of description and that in practice the diaphragm assembly 30 "floats" relative to the tube 50 so that a predetermined pressure is maintained in the chamber 42 which pressure is lower than atmospheric pressure but higher than the absolute pressure of the vacuum source at the vehicle engine.

The construction of the vacuum regulator as described provides for a relatively constant pressure in the chamber 42 which is independent of pressures at the intake manifold of the engine which are lower than the pressure to be maintained in the chamber so that during normal operation of the vehicle, fluctuations in the engine speed will not affect the pressure being maintained in the chamber 42.

The chamber 42 of the vacuum regulator 14 communicates with the variable volume chamber 15 in the body 13 through the conduits 16, 17 as previously noted. The conduits 16, 17 are formed of flexible materials and communicate with the chamber 42 of the vacuum regulator by way of suitable nipples or connections 60, 61 respectively which are formed integrally with the housing member 21 of the regulator 14. In the illustrated embodiment, the conduits 16, 17 extend from the vacuum regulator 14 around the body 13 into suitable fittings 62, 63, communicating with the chamber 15 at a point substantially diametrically opposite the location of the vacuum regulator 14. This construction permits the conduits 16, 17 to be connected between the regulator 14 and chamber 15 without undue bending and crimping. The body 13 may be provided with a suitable retaining groove such as that shown at 65, which snugly receives the conduits 16 and 17 and maintains the conduits in a fixed position relative to the body.

The fitting 62 associated with the conduit 16 is a tubular member which opens into the chamber 15 so as to communicate the chamber 15 with the chamber 42 in the vacuum regulator 14 at all times. When the valve V has been opened as described, and vacuum is applied to the regulator 14 through the fitting 51, the conduit 16 tends to equalize the pressures in the chamber 42 of the regulator 14 and the chamber 15. As illustrated in FIG. 4, the conduit 16 includes a flow restricting means 66 which, in the preferred embodiment, is formed by strands of wire 67 in the form of a cable which is encapsulated within an elongated body 68 of rubber-like material. The body 68 is fitted snugly within an outer sleeve 70 of the conduit 16, and which sleeve provides the connection between the fittings 60, 62. When the aforementioned regulated vacuum pressure is established in the chamber 42 of the vacuum regulator 14, the cable 67 provides an extremely high impedance to the flow of air from the chamber 15 to the chamber 42, due to the extremely small flow passages formed between adjacent strands of the cable 67.

The chamber 15 is formed in part by a recess 75 in the body 13 and includes a movable upper wall, as viewed in the drawings, formed by a diaphragm assembly 76. The diaphragm assembly 76 includes a flexible rubber-like diaphragm member 77 and a disc shaped non-metallic plate member 80 supported for movement with the diaphragm member 76 by a circular flange portion 81 of the diaphragm which has a generally L-shaped quarter section, as shown in FIG. 2. The diaphragm assembly 76 is maintained in sealing engagement with the body member 13 across the top of the recess 75, as viewed in the drawings, by a retainer member 81 which urges sealing lips 82 of the diaphragm member 77 into sealing engagement with suitably configured grooves in a shoulder 83 of the recess 75.

The member 81 includes a plurality of perforations 84 for communicating the top surface of the diaphragm assembly 76 with atmospheric pressure. The radially outer edges of the member 81 include a plurality of upwardly extending teeth which dig into the material of the base member 13 so as to prevent loosening of the member 81 in the recess 75 and possible loss of sealing relationship between the diaphragm member and the body 13. As the pressures in the chamber 15 and the chamber 42 are gradually equalized due to air flow through the cable 67, as described, the atmospheric pressure acting on the upper surface of the diaphragm assembly 76 increases relative to the pressure in the chamber 15, resulting in a gradual movement of the diaphragm assembly 76 toward the bottom of the recess 75. After a predetermined time, the pressure in the chamber 15 has reduced to a level sufficient to permit actuation of the switch S3 by the diaphragm assembly 76 to open the contacts thereof and effect disengagement of the compressor C from the vehicle engine.

As illustrated in FIG. 2, the switch S3 includes a pivoted actuating member 90 supported by a frame or base member 91 attached to the body member 13 and which is pivoted with respect to base member 91 at 92. The actuating member 90 is connected to a pivot member 93 by a spring 94 and which spring, as shown in FIG. 2, urges the member 90 into engagement with the rigid disc 80 of the diaphragm assembly 76. The member 93 is pivotally connected at 95 to a moving contact arm 94 so that as the member 90 is pivoted downwardly about the pivot point 92 by the diaphragm assembly 76 in response to reduction of pressure in the chamber 15, the member 93 is abruptly pivoted about the point 96 to urge the moving contact arm 94 upwardly as viewed in FIG. 2 thereby disengaging the contacts 94a, 94b of the switch S3. It is apparent that the spring 94 urges the actuating member 90 to its position illustrated in FIG. 2 and accordingly tends to resist movement of the diaphragm assembly 76 downwardly into the recess 75. Disengagement of the contacts 94a, 94b is effective to open the circuit between the battery terminal B+ through the solenoid coil E for the clutch D of the air conditioning compressor C as described above in reference in FIG. 1. The switch S3 is of a generally known construction and is illustrated and described in greater detail in U.S. Patent No. 2,651,690, assigned to Ranco Incorporated.

The conduit 17 is a tabular member which is connected between the vacuum regulator 14 and the chamber 15 by the fittings 61, 63. In the preferred embodiment, the fitting 63 includes a nozzle portion 96 at its end which cooperates with a temperature responsive valve closure means 100 positioned in the chamber 15 and which valve closure means includes a valve member 101 movable into engagement with the opening in the nozzle portion 96 to block communication between the chamber 15 and the chamber 42 through the conduit 17, and which moves away from the opening to provide for unrestricted communication between the chamber 15 and the chamber 42. The valve member 101 is constructed of a relatively rigid body of material supported by a cantilevered bimetallic arm 102 which is in turn fixed to a support 103 connected to the body member 13. The arm 102 is constructed so as to move the valve member 101 away from the opening in the nozzle 96 at temperatures below a predetermined temperature, such as 36° F., and which is effective to move the valve member 101 into sealing engagement with the opening at temperatures above the aforementioned temperature as shown in FIG. 3. As the valve member 101 moves into engagement with the nozzle portion 96, the nozzle is deformed and the opening therethrough is sealingly closed by the valve member. When temperatures ambient the time delay mechanism are below 36° F., the arm 102 is flexed to move the valve member 101 to the right, as viewed in FIG. 3, and away from the nozzle so that when the control switch S1 is closed and the valve V is opened, as described, the pressure in the chamber 42 of the vacuum regulator 14 is immediately communicated to the chamber 15 through the unrestricted conduit 17 and immediately moves the diaphragm assembly 76 downwardly into the chamber 15, as viewed in FIG. 2, to effect actuation of the switch S3, opening its contacts 94a, 94b, and interrupting the energizing circuit of the solenoid coil E. While in the preferred embodiment the valve member 101 is composed of a rigid material and the nozzle 96 is deformable, it should be apparent that the valve member could be constructed of a deformable substance and the nozzle 96 of a relatively rigid material.

When temperatures ambient the time delay mechanism 10 are above the predetermined temperature, the valve member 101 closes the opening in the nozzle so that the pressure within the chamber 15 is gradually reduced to the pressure in the chamber 42 of the vacuum regulator due to the flow restricting action of the conduit 16 as described previously. Thus, at temperatures below 36° F. and when the defogging switch S1 is closed, it is apparent that the compressor C of the air conditioner is drivingly connected to the vehicle engine to operate the air conditioning system for a short period as controlled by the time delay mechanism 10. Time delay mechanisms which are constructed in accordance with the present invention may provide for operation of the air conditioning compressor C for as long as 300 seconds and as short as 100 seconds depending upon the flow restricting characteristics of the particular cable 67 utilized in the conduit 16. If it is found that the time delay provided by the restrictor 66 is not of adequate duration, the restrictor 66 may be replaced by one having greater restriction.

While but a single embodiment of the present invention has been illustrated and described herein in considerable detail, the present invention is not to be considered to be limited to the precise construction shown. It is my intention to cover hereby all adaptations, modifications and uses of the present invention which come within the scope of the appended claims.

Having described my invention, I claim:

1. A vacuum pressure fluid operated time delay mechanism comprising, fluid pressure regulating means including valve means for connection to a source of vacuum fluid pressure and operable to provide a regulated substantially constant pressure at a port thereof, means defining a chamber including a flexible diaphragm member forming a wall of said chamber, a fluid passageway connected between said chamber and said port of said valve means for equalizing the fluid pressure therebetween, a flow restrictor in said passageway for impeding the flow of fluid therethrough and producing a gradual equalization of pressure between said chamber and said port with said diaphragm member being moved in response to a differential fluid pressure exerted thereon as fluid pressure in said chamber changes, and switch means positioned adjacent said diaphragm member and operable between a first position wherein contacts of said switch means are closed and a second position wherein said contacts are open, said switch means including a part engageable by said diaphragm member and operated from one of its said positions to said other position in response to movement of said diaphragm in engagement with said part.

2. A time delay mechanism as defined in claim 1 and further including a second fluid passageway between said chamber and said valve means for providing a substantially unrestricted flow therebetween, and condition responsive valve means including a valve member operable between a first position wherein said second passageway is closed to fluid flow therethrough and a second position wherein said second passageway is effective to unrestrictedly communicate said chamber and said valve means.

3. A time delay as defined in claim 2 wherein said condition responsive valve means includes temperature responsive actuating means for moving said valve member between said positions in response to temperatures above a predetermined temperature.

4. A time delay mechanism as defined in claim 3 wherein said temperature responsive actuating means includes a bimetallic member fixed at a first end and having a second end carrying said valve member said second end effective to move said valve member between said positions.

5. A time delay mechanism as defined in claim 3 wherein said second fluid passageway is closed to fluid flow therethrough at temperatures above approximately 36° F.

6. A time delay mechanism as defined in claim 1 wherein said flow restrictor includes a plurality of closely spaced wire-like members extending longitudinally along said first fluid passageway.

7. A fluid operated mechanism for performing a control function a predetermined time after establishment of an operating fluid pressure comprising fluid pressure regulating means communicating with a source of fluid at operating pressure and operable to produce a relatively constant output pressure substantially independent of variations in said operating pressure, means defining a chamber including a movable member having a first surface defining a wall of said chamber and a second surface exposed to ambient fluid pressure, conduit means connected between said chamber and said pressure regulating means for communicating said output pressure at said regulating means with said chamber, said conduit means including a first conduit having flow restriction for producing a gradual pressure change in said chamber and a second conduit for unrestricted communication between said regulating means and said chamber, said gradual pressure change in said chamber providing a gradually changing differential pressure force on said member to effect movement thereof, and function control means operated by said movable member including a part movable by said member to initiate performance of a control function, and condition responsive valve means including a valve member having a first position wherein said second conduit is effective to communicate said regulating means and said chamber to effect substantially immediate operation of said function control means and a second position wherein said second conduit is blocked and said function control means is operated by said movable member in response to said gradual pressure change in said chamber.

8. A time delay mechanism as defined in claim 7 wherein said condition responsive valve means includes an arm member composed of dissimilar metallic materials supported in said chamber and movable in response to temperature changes, and with said valve member connected to said arm member for movement therewith.

9. A time delay mechanism as defined in claim 7 wherein said flow restriction in said first conduit includes a plurality of closely spaced wire-like members extending along said first conduit.

10. A time delay mechanism as defined in claim 7 wherein said function control means includes a snap acting switch positioned within said chamber.

11. In a heating and air conditioning system for an automotive vehicle including solenoid actuated clutch means for connecting and disconnecting a compressor of said system and an engine of said vehicle, a vacuum operated time delay mechanism for effecting operation of said clutch means to connect said compressor to said engine by said clutch means for an interval subsequent to initiating operation of a portion of said system, and comprising vacuum regulator means connected to a source of vacuum pressure at said engine and operable to provide a regulated, substantially constant vacuum pressure at a port thereof, means defining a chamber including a movable member having a first surface exposed to fluid pressure in said chamber and a second surface exposed to atmospheric pressure, conduit means communicating said chamber and said port of said regulator means including a restricted flow passage for impeding fluid flow from said chamber to said port and providing a gradual reduction of fluid pressure in said chamber, said reduction of pressure in said chamber producing a gradually increasing differential fluid pressure on said movable member to effect movement thereof into said chamber, switch means in said chamber having contacts which are engaged to complete an energization circuit for said solenoid of said clutch means and disengaged to interrupt said energization circuit, said movable member engaging a part of said switch means and effecting movement of said part to disengage said contacts.

12. A heating and air conditioning system as defined in claim 11 and further including valve means connected between said vacuum regulator means and said source of vacuum pressure, said valve means being opened to communicate said regulator means to said source of pressure when said portion of said system is rendered operative.

13. An automotive heating and air conditioning system as defined in claim 11 wherein said conduit means further includes an unrestricted flow passage between said regulator means and said chamber, and further including valve means for preventing flow through said unrestricted passageway at temperatures above a predetermined temperature.

14. An automotive heating and air conditioning system as defined in claim 13 wherein said valve means includes a bimetallic member and a valve member attached to said bimetallic member, said bimetallic member movable in response to temperature changes to move said valve member relative to said unrestricted flow passage to open and close said flow passage.

References Cited

UNITED STATES PATENTS

| | | | |
|---|---|---|---|
| 2,929,898 | 3/1960 | Schaefer | 200—34 XR |
| 3,037,101 | 5/1962 | Komatar | 200—34 XR |
| 3,142,160 | 7/1964 | Hiyoshi | 62—323 XR |
| 3,359,749 | 12/1967 | Howland | 62—323 XR |

MEYER PERLIN, *Primary Examiner.*